3,784,692
17-PROPIONATE, 21-ESTER DERIVATIVES OF 6α,9α-DIFLUOROPREDNISOLONE, COMPOSITIONS AND USE
Alberto Ercoli, Milan, and Rinaldo Gardi, Carate Brianza, Italy, assignors to Warner-Lambert Company, Morris Plains, N.J.
No Drawing. Continuation-in-part of application Ser. No. 880,962, Nov. 28, 1969, which is a continuation-in-part of application Ser. No. 735,536, June 10, 1968, both now abandoned. This application Dec. 9, 1971, Ser. No. 206,523
Claims priority, application Italy, June 16, 1967, 17,273/67
Int. Cl. A61k 27/00
U.S. Cl. 424—243          15 Claims

ABSTRACT OF THE DISCLOSURE

There have been prepared the new 17-propionate, 21-acetate, 17-propionate, 21-isobutyrate and 17,21-dipropionate of 6α,9α-difluoroprednisolone useful as anti-inflammatory agents. They may be incorporated in a suitable pharmaceutical carrier to obtain pharmaceutical compositions for the systemic and local treatment of inflammatory conditions and diseases.

CROSS-REFERENCE TO RELATED APPLICATION

This application is a continuation-in-part of our co-pending application, U.S. Ser. No. 880,962, filed Nov. 28, 1969, now abandoned; said U.S. Ser. No. 880,962 is a continuation-in-part of U.S. Ser. No. 735,536, filed June 10, 1968, now abandoned.

DESCRIPTION OF THE INVENTION

This invention relates to pharmaceutical compositions containing new anti-inflammatory steroids with increased topical and systemic activity and to a method of using said new steroids incorporated in a topical or systemic pharmaceutical carrier for the treatment of inflammatory conditions in animals and humans.

The new steroids of this invention are 17-propionate, 21-esters of 6α,9α-difluoroprednisolone represented by the following formula:

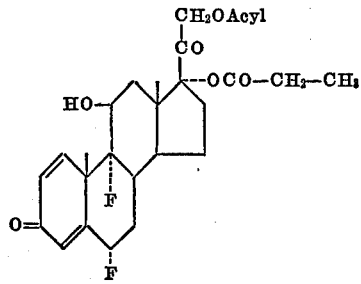

wherein Acyl is a lower alkanoic acid radical selected from the group consisting of acetyl, propionyl and isobutyryl.

The pharmaceutical compositions of this invention containing the new compounds as defined above are particularly suitable for systemic and topical use in the treatment of inflammatory conditions and diseases.

6α,9α-difluoroprednisolone and 21-esters thereof are purported to be potent gluco-corticoids and are believed to be useful as anti-inflammatory agents. Unfortunately, their undesirable sodium retaining properties and their limited activity on topical application have limited their usefulness.

We have now found that the 17-propionates, 21-esters of 6α,9α-difluoroprednisolone possess the unusual property of being active as anti-inflammatory agents both for topical and systemic use, as it is evidenced by bioassays especially designed for measuring topical and systemic activity of corticosteroids (e.g. vasoconstriction test, agar granuloma and granuloma pouch assay). The remarkable activity of the specific compounds of this invention appears to result by the combination of a 17-propionate with a 21-ester group as defined above in 6α,9α-difluoroprednisolone, thus providing potent anti-inflammatory steroids, particularly valuable for animal or human use.

The compositions of this invention comprise the 17-propionate, 21-ester derivatives as defined above of 6α,9α-difluoroprednisolone in combination with one or more non-toxic pharmaceutical carriers or bases. These therapeutically useful compositions can be used in several pharmaceutical forms according to the way of administration, e.g. parenterally, orally, rectally or topically. Thus, the active ingredients may be compounded with the usual carriers for the preparation of conventional dosage forms, such as pills, tablets, capsules, syrups, aqueous suspensions or oily solutions or other forms particularly fit for systemic use in corticosteroid therapy.

For topical application, which is the preferred way of administration, the active ingredients can be incorporated in the usual compatible vehicles utilized for the production of ointments, lotions, creams, emulsions, drops, sprays, suppositories, tablets or pellets and aerosols, as it is well known in the pharmaceutical art. Ointments may be formulated, for example, for both hydrophilic and hydrophobic applications and when lotions are formulated they may comprise aqueous or non-aqueous bases.

The pharmaceutical carriers which are suitable are those usually employed in pharmaceutical formulation techniques such as, for example, fats, vegetable oils, fatty acids, alcohols, poly-alkylene glycols, waxes, petrolatum, polyesters, etc. and may be combined with water and gelling agent when compatible.

The 17-propionates, 21-esters of 6α,9α-difluoroprednisolone are included in the pharmaceutical compositions of this invention in an amount sufficient to produce the desired therapeutic effect upon the inflammatory process or condition. Advantageously, the compositions will contain the active ingredient in an amount of from 0.0005% to 5% by weight and, preferably, contain the specific active ingredient in an amount of from about 0.001 to about 0.25% by weight.

The compositions of this invention are used by oral or parenteral route for the systemic treatment of arthritis and related diseases. When topically applied, they are useful for the treatment of dermatitis of various type, psoriasis, and other allergic conditions which respond to the topical application of anti-inflammatory steroids.

These anti-inflammatory topical compositions are applied to the affected sites several times daily. Other substances, such as bacteriostatic agents, antibiotics, cosmetically desirable pigments, perfumes and local anesthetics may also be incorporated in these topical anti-inflammatory compositions if these added properties or characteristics are desired.

The method of this invention comprises topically or internally administering in an amount sufficient to produce therapeutic effects a 17-propionate, 21-ester of 6α, 9α-difluoroprednisolone incorporated in a nontoxic pharmaceutical carrier suitable for topical or systemic use such as exemplified above. The 17-propionate, 21-ester of 6α,9α-difluoroprednisolone advantageously will be administered in an amount from 0.0005 to 5 percent by weight, and preferably from about 0.001 to about 0.25 percent by weight, in equal doses one to three times daily in order to cause complete suppression of inflammatory processes or conditions.

The preferred compositions of this invention comprise 17,21-dipropionate or 17-propionate, 21-isobutyrate of 6α, 9α-difluoroprednisolone and a nontoxic pharmaceutical carrier.

The compounds of this invention can be prepared starting from 6α,9α-difluoroprednisolone according to the following reaction sequence:

SCHEME A

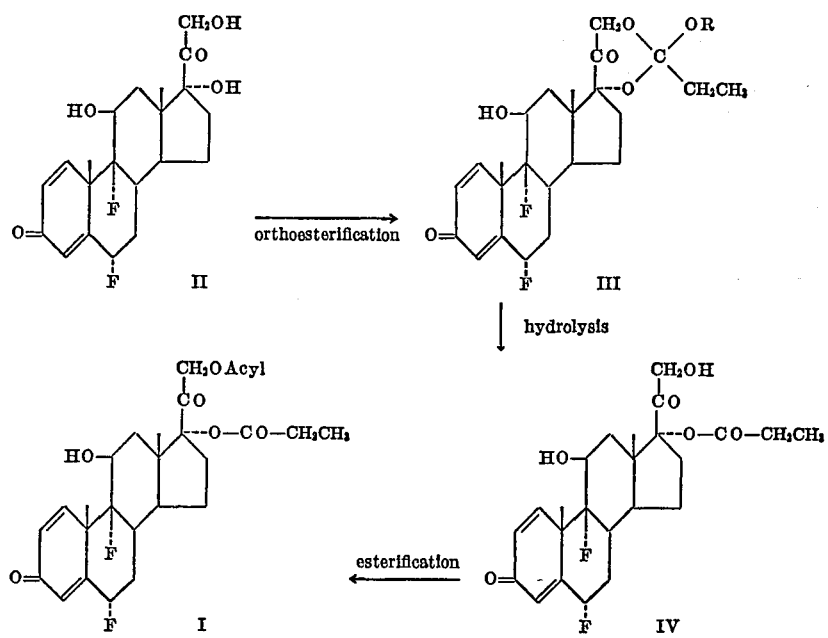

in which R is lower alkyl, preferably methyl or ethyl and Acyl has the meaning stated above. The process is accomplished by reacting 6α,9α-difluoroprednisolone with a lower alkyl orthopropionate, preferably methyl orthopropionate or ethyl orthopropionate in an organic solvent and in the presence of an acid catalyst. The reaction is carried out at a temperature ranging from 60 to 130° C. and preferably around 100–110° C. for a period of 8–24 hours, whereby the 17α,21-orthopropionate of Formula III forms as a mixture of two epimeric orthoesters. From the mixture a crystalline product can be isolated, whose physical properties depend on the percentage of the epimers. The orthopropionate thus obtained is then hydrolyzed in an acidic medium according to the process described in Gazzetta Chimica Italiana, 1963, vol. 93, pp. 413–450, to give the 17-monopropionate IV. This latter compound is then esterified at the 21-OH group by treatment with acetic, propionic or isobutyric acid anhydride in pyridine according to the usual known procedures.

The steps of this process can be carried out with or without isolating the epimeric 17α,21-orthoesters III or the 17-monoester IV.

Alternatively, the compounds of this invention can be prepared starting from $\Delta^{4,9(11)}$-pregnadiene-17α,21-diol-3,20-dione according to the following reaction sequence:

SCHEME B

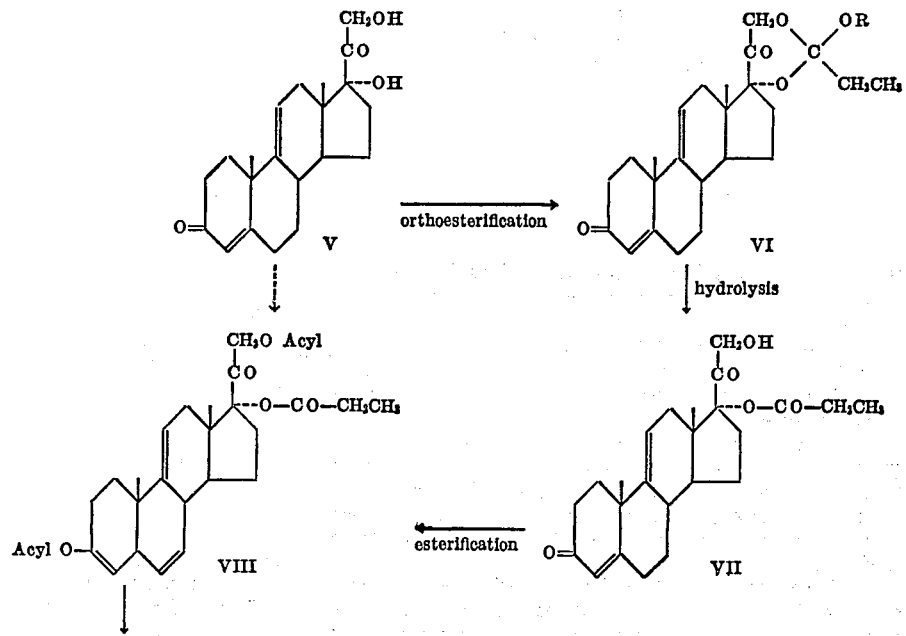

SCHEME B—Continued

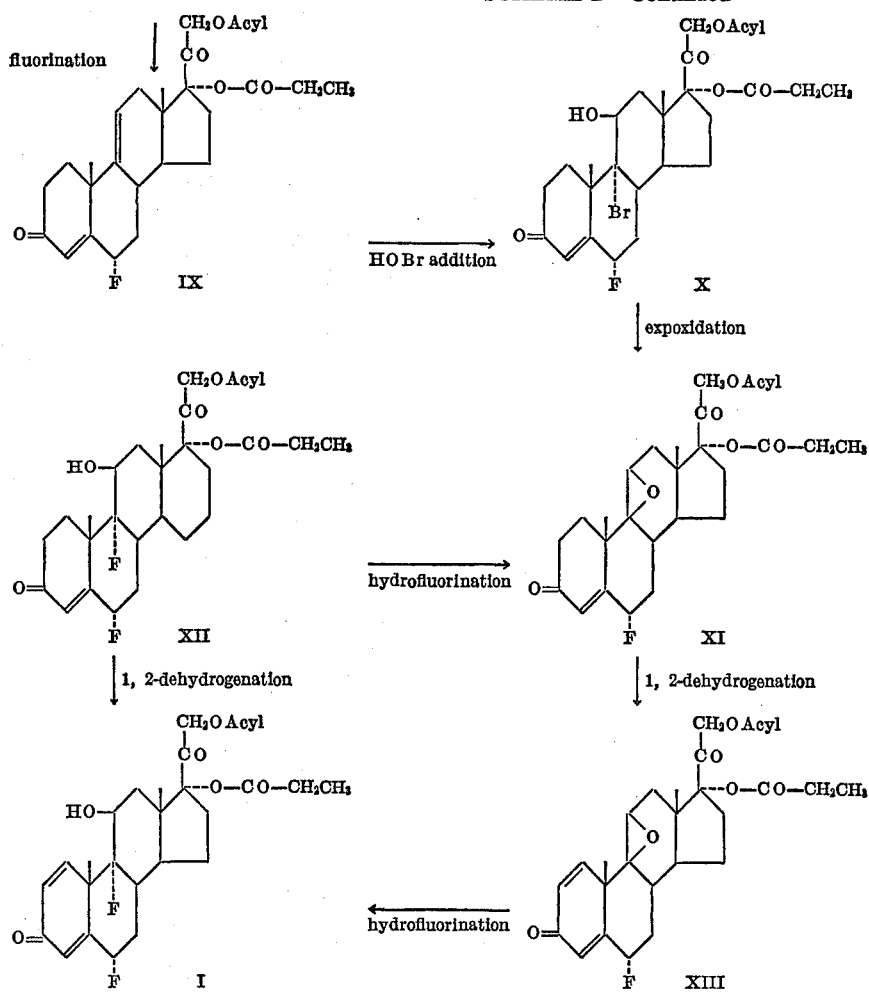

The above process identified as Scheme B is carried out by orthoesterification of the starting material V with a lower alkyl orthopropionate such as methyl or ethyl orthopropionate which results in a mixture of two epimeric orthoesters VI. These can be directly hydrolyzed to the corresponding 17-monopropionate VII according to the procedure set forth above for Scheme A in an organic solvent and in the presence of an acid catalyst and as described in U.S. Pat. 3,152,154. The 17-monoester thus obtained is then esterified by being reacted with acetic, propionic or isobutyric acid anhydride in the presence of an acid catalyst to give the triester VIII.

When the triester to be prepared is the 3,17,21-tripropionate it is convenient to employ, instead of the above three-step procedure, the method of direct esterification of $\Delta^{4,9(11)}$-pregnadiene-17,21-diol-3,20-dione V with propionic anhydride, using strong acylating conditions to afford simultaneously esterification of both 17α- and 21-hydroxy groups and enol-esterification of the 3-keto group.

The triester VIII is fluorinated at the 6-position by treatment with perchloryl fluoride and the reaction product, consisting of a mixture of 6β-fluoro-$\Delta^{4,9(11)}$-pregnadiene - 17α,21 - diol-3,20-dione 17-propionate, 21-acylate and of the corresponding epimeric 6α-fluoro compound, is converted, for example by acid treatment, into the 6α-fluoro-$\Delta^{4,9(11)}$-pregnadiene-17α,21-diol-3,20-dione 17-propionate, 21-acylate shown as Compound IX. Treatment of Compound IX with a source of hydrobromous acid, for example with N-bromo-acetamide in the presence of perchloric acid, gives the bromohydrin Compound X, from which the 6α-fluoro-9β,11β-oxido-$\Delta^4$-pregnene-17α, 21-diol-3,20-dione 17-propionate, 21-acylate shown as Compound XI is obtained by epoxidation for example with potassium acetate.

On opening the epoxy ring with hydrogen fluoride there is then obtained the 6α,9α-difluorohydrocortisone 17-propionate, 21-acylate XII. The double bond in 1,2-position can be introduced into Compound XII by known chemical methods, for example by use of selenium dioxide or by use of dichlorodicyanobenzoquinone.

Alternatively, the double bond can also be introduced before opening the oxido ring, to convert Compound XI, the 6α-fluoro-9β,11β-oxido-$\Delta^4$-pregnene-17α,21-diol-3,20-dione 17-propionate,21-acylate, into the corresponding 6α - fluoro - 9β,11β - oxido-$\Delta^{1,4}$-pregnadiene-17α,21-diol, 3,20-dione 17-propionate,21-acylate. The latter, which is Compound XIII, can then be treated with hydrogen fluoride to give the desired 6α,9α-difluoroprednisolone 17-propionate, 21-acylate identified as Compound I.

In order further to illustrate this invention the following examples are given.

Example 1 (SCHEME A)

Orthoesterification

A mixture of 1 g. of 6α,9α-difluoroprednisolone, 10 mg. of p-toluenesulphonic acid, 5 cc. of dimethylformamide and 3 cc. of methyl orthopropionate is heated for 15 hours on an oil bath at 105° C. while a slow stream of nitrogen is passed through the mixture so that the methanol produced as a by-product of the reaction is distilled off. After addition of several drops of pyridine to neutralize the acid catalyst, the reaction mixture is evaporated under vacuum and there is obtained a solid residue which is taken up with methanol, and filtered. The product is recrystallized from a methylene chloride-methanol mixture to yield 6α,9α-difluoroprednisolone 17α,21-methylorthopropionate, also identified as 17α,21-

(1'-methoxy)-n-propylidenedioxy - 6α,9α - difluoro - Δ$^{1,4}$-pregnadien-11β-ol-3,20-dione, M.P. 215–219° C.

$$[\alpha]_D^{22} = +64.5°$$

(dioxane, c.=0.05%).

U.V.: λ$_{max.}$ 237–238 mμ, $$E_{1cm.}^{1\%} = 330 \text{ (ethanol)}$$

I.R.: ν$_{max.}$ 3320, 1724, 1663, 1618, 1606, 1096, 1065, 1022 and 933 cm.$^{-1}$ (Nujol).

Hydrolysis

A suspension of 1 g. of the 6α,9α-difluoroprednisolone 17α,21-methylorthopropionate in 10 cc. of methanol is treated with 2 cc. of a 2 N aqueous solution of oxalic acid and heated on a water bath at 40–50° C. for about 5–10 minutes and, afterwards, the mixture is concentrated under vacuum. The residue is then shaken with water, the insoluble product is filtered off and then dried. The solid material is recrystallized from acetone-ether and 6α,9α-difluoroprednisolone 17-propionate is obtained, M.P. 212–215° C., $[\alpha]_D^{22} = +9°$ (dioxane, c.=0.5%).

U.V.: λ$_{max.}$ 237–238 mμ, $$E_{1cm.}^{1\%} = 362 \text{ (ethanol)}$$

Esterification

A solution of 500 mg. of 6α,9α-difluoroprednisolone 17-propionate in 2.5 cc. of pyridine is treated with 1.25 cc. of acetic anhydride and the reaction mixture permitted to stand overnight at 0° C. The reaction mixture is then poured into ice water and the crystalline precipitate formed is filtered off and recrystallized from a methylene chloride-ether-petroleum ether mixture to yield 6α,9α-difluoroprednisolone 17-propionate, 21-acetate; M.P. 229–232° C., $[\alpha]_D^{22} = +30.5°$ (dioxane, c.=0.5%).

U.V.: λ$_{max.}$ 237–238 mμ, $$E_{1cm.}^{1\%} = 326 \text{ (ethanol)}$$

A solution of 500 mg of 6α,9α-difluoroprednisolone 7-propionate in 2.5 cc. of pyridine is treated with 0.6 cc. of isobutyric anhydride and allowed to stand overnight at 0° C. The reaction mixture is then poured into ice water, the precipitate is filtered and recrystallized from methylene chloride-ether to yield 400 mg. of 6α,9α-difluoroprednisolone 17-propionate 21-isobutyrate, M.P. 180–182°, $[\alpha]_D^{22} = +32.5°$ (dioxane, c.=0.5%).

U.V.: λ$_{max.}$ 237–238 mμ, $$E_{1cm.}^{1\%} = 317 \text{ (ethanol)}$$

In analogous manner, by treating 6α,9α-difluoroprednisolone 17-propionate with propionic anhydride in pyridine 6α,9α-difluoroprednisolone 17,21-dipropionate is obtained, M.P. 227–231° C., $[\alpha]_D^{22} = +33°$ (dioxane, c.=0.5%).

U.V.: λ$_{max.}$ 237–238 mμ, $$E_{1cm.}^{1\%} = 290 \text{ (ethanol)}$$

EXAMPLE 2 (SCHEME B)

Orthoesterification and hydrolysis

A mixture of 20 g. of Δ$^{4,9(11)}$-pregnadiene-17α,21-diol-3,20-dione (prepared as described in J. Am. Chem. Soc., 79, 1130; 1957) 200 mg. of p-toluenesulphonic acid, 80 cc. of dimethylformamide and 30 cc. of methyl orthopropionate is heated for 7–8 hours at 105° C. while a slow stream of nitrogen is passed through the mixture so that the methanol produced by the reaction is distilled off. After addition of 1 cc. of pyridine to neutralize the acid catalyst the reaction mixture is concentrated under vacuum and the semi-solid residue, consisting of the epimeric mixture of 17α,21-orthopropionates is suspended in 200 cc. of methanol. This suspension is treated with 30 cc. of a 2 N aqueous solution of oxalic acid and heated on a water bath at 40–50° C. for a few minutes to effect hydrolysis of the orthoester.

Esterification

The mixture obtained is then concentrated under vacuum and the residue consisting of 17α-propionyloxy-Δ$^{4,9(11)}$-pregnadien-21-ol-3,20-dione is treated with 500 cc. of acetic anhydride and 2.4 g. of p-toluenesulphonic acid and the mixture maintained for 1 hour under nitrogen at 80° C. The acetylated product is then poured into ice water and the crystalline product obtained is filtered off, washed with water and recrystallized from a methanol-methylene chloride mixture to give the 3,21-diacetoxy-17α-propionyloxy-Δ$^{3,5,9(11)}$-pregnatrien - 20-one which is Compound VIII.

Fluorination 6 g. of the above 3,21-diacetoxy-17α-propionyloxy-Δ$^{3,5,9(11)}$-pregnatrien-20-one are dissolved in 330 cc. of dioxane containing 35% water, and perchloryl fluoride is bubbled into the solution for 1½ hours at room temperature to fluorinate at the 6-position. The excess of perchloryl fluoride is eliminated by passing a nitrogen stream through the mixture and the product formed is precipitated by addition of water, filtered off and then washed with water. A mixture of epimeric 6α and 6β fluoro derivatives is obtained which is converted to the 6α fluoro compound by dissolving the mixture in acetic acid, saturating the solution with anhydrous hydrogen chloride and by letting the acid mixture stand overnight at room temperature.

Hypobromous acid addition and epoxidation

The above acid mixture is then poured into ice water and the product, consisting of 6α-fluoro-Δ$^{4,9(11)}$-pregnadiene-17α,21-diol-3,20-dione 17-propionate, 21-acetate (Compound IX) is filtered off and dissolved in 60 cc. of anhydrous dioxane. To the solution thus obtained there are added 4.5 cc. of 0.46 N perchloric acid and then 2.1 g. of N-bromoacetamide. The mixture is stirred for two hours, then the excess of N-bromoacetamide is destroyed by addition of 9 cc. of a 10% aqueous solution of sodium bisulphite. By pouring the mixture into ice water there is obtained a precipitate, consisting of 6α-fluoro-9α-bromohydrocortisone 17-propionate, 21-acetate (Compound X) which, after drying, is dissolved in 80 cc. of acetone. To this solution there are then added 2 g. of anhydrous potassium acetate and the mixture is refluxed for 17 hours. The solvent is evaporated under vacuum and the residue is diluted with water to give 9β-11β-oxido-6α-fluoro-Δ$^4$-pregnene-17α,21-diol-3,20-dione 17-propionate, 21 acetate (Compound XI).

Hydrofluorination and 1,2-dehydrogenation

A solution of 1 g. of the epoxy derivative thus obtained in 10 cc. of anhydrous chloroform is cooled at −50° C. and treated with a solution consisting of 5.2 cc. of tetrahydrofurane and 5 cc. of a solution of 2 parts of hydrogen fluoride in 1 part of tetrahydrofurane. The reaction mixture formed is maintained at −25° C. for 4 hours then poured into a mixture of 33 g. of anhydrous potassium carbonate, 120 cc. of ice water and 70 cc. of chloroform. The aqueous phase is extracted with chloroform and the organic layer is washed with water until neutrality. After separation of the wash water and evaporation of the solvent under vacuum, the residue is taken up with ether and the ether filtered off leaving a residue of 6α,9α-difluorohydrocortisone 17-propionate, 21-acetate (Compound XII).

A solution of 500 mg. of 6α,9α-difluorohydrocortisone 17-propionate, 21-acetate and 350 mg. of 2,3-dichloro-5,6-dicyano-1,4-benzoquinone in 5 cc. of anhydrous dioxane is refluxed for 24 hours, then the solvent is eliminated under vacuum and the residue taken up with methylene chloride. The crystalline dichlorodicyanohydroquinone is eliminated by filtration and the solution is chromatographed on 10 g. of alumina. By elution with methylene chloride, the 6α,9α-difluoroprednisolone 17-propionate, 21-acetate is obtained, identical to the product described in Example 1.

EXAMPLE 3

1,2-dehydrogenation and hydrofluorination

By treating the 9β,11β-oxido-6α-fluoro - Δ$^4$ - pregnene-17α, 21-diol-3,20-dione 17-propionate, 21-acetate (Compound XI) with dichlorodicyanobenzoquinone according to the procedure set forth above in Example 2, the corresponding 9β,11β - oxido - 6α - fluoro-Δ$^{1,4}$-pregnadiene-17α,21 - diol - 3,20 - dione 17 - propionate, 21-acetate is obtained (Compound XIII) and converted into 6α,9α-difluoroprednisolone 17-propionate, 21-acetate (Compound I) by treatment with hydrogen fluoride as described above in the hydrofluorination step of Example 2.

EXAMPLE 4 (SCHEME B)

Esterification

A mixture of 10 g. of Δ$^{4,9(11)}$-pregnadiene-17α,21-diol-3,20-dione, 500 cc. of propionic anhydride and 2.5 g. of p-toluenesulphonic acid is maintained for 1 hour under nitrogen at 80° C. The reaction mixture is then poured into ice water and the crystalline product obtained is filtered off, washed with water and recrystallized from a methanol-methylene chloride mixture to give the 3,17α,21-tri-propionyloxy-Δ$^{3,5,9(11)}$-pregnatrien-20-one.

This compound is then submitted to the further steps as described in Example 2 for the corresponding 3,21-diacetoxy - 17α - propionyloxy - Δ$^{3,5,9(11)}$-pregnatrien-20-one to give 6α,9α - difluoroprednisolone 17,21-dipropionate.

EXAMPLE 5

Biological assays

The topical and systemic anti-inflammatory activity of the 17-propionate, 21-esters of this invention was determined using the following biological assays:

(a) Vasoconstriction assay.—This method measures the degree of evident blanching caused by various dilutions of corticosteroids when applied to the human skin. The experimentation was carried out on 24 human volunteers using a modification of the McKenzie's original procedure as communicated by G. Falconi and G. L. Rossi on "Fourth International Congress on Pharmacology," July 14–18, 1969 in Basel, Switzerland.

17-propionate 21-acetate, 17-propionate 21-isobutyrate and 17,21-dipropionate of 6α,9α-difluoroprednisolone were submitted to this assay and compared with the topically active betamethasone 17-valerate. The test steroids dissolved in 95% alcohol solution were applied by paper-patches to the flexor surfaces of the forearms of each of 24 subjects. The patches were removed after 18 hours and the arms examined for vasoconstriction by three independent observers who scored from zero to three according to the blanching degree within each subject. The responses were recorded as a percent of the maximum blanching, score 3 being considered equal to 100.

The results obtained in four experiments with each of the test steroids at various dose-levels are reported in Table I, where vasoconstriction is expressed in percent (%) of the maximum blanching.

TABLE I
Vasoconstriction

| Dose, μg. | 6α, 9α-difluoroprednisolone | | | Betamethasone 17-valerate, percent |
|---|---|---|---|---|
| | 17-propionate 21-acetate, percent | 17-propionate 21-propionate, percent | 17-propionate 21-isobutyrate, percent | |
| 0.02 | 21 | | | 10 |
| 0.03 | | 41 | 46 | 19 |
| 0.05 | 45 | 47 | | |
| 0.06 | | 64 | 72 | 35 |
| 0.12 | | 83 | | 58 |
| 0.125 | 67 | | 80 | 58 |

These results show that the compounds of this invention are more potent than betamethasone 17-valerate. The calculation of the relative potencies indicates that difluoroprednisolone 17,21-dipropionate and 17-propionate 21-isobutyrate are at least twice more active than betamethasone 17-valerate which is internationally recognized as one of the most effective anti-inflammatory steroids for topical application.

(b) Granuloma pouch assay.—This test was performed according to the technique of Robert and Nezamis (Acta Endocr., 25, 105; 1957), using adult female rats (Sprague-Dawley) weighing about 150 g. The rats were injected subcutaneously with 25 ml. of sterile air under ether anesthesia, and croton oil (0.5 ml. of 1% solution in corn oil) was injected into the air sac. The test steroids dissolved in 0.2 ml. of sesame oil were directly administered on day 5 into the cavity of the pouch.

On day 9 the animals were sacrificed and the exudate was collected and measured, the volume of exudate being inversely proportional to the anti-inflammatory potency of the steroid.

TABLE II
Granuloma pouch

| Compound into pouch (0.2 ml./oil) | Single dose | | Exudate volume (ml.) | Percent inhibition of exudate |
|---|---|---|---|---|
| | μmole | μg. | | |
| Control | | | 20.9±3 | 0 |
| 6α,9α-difluoroprednisolone: | | | | |
| 17-propionate 21-propionate | 0.01 | 0.00509 | 10.1±3 | 55 |
| 17-propionate 21-isobutyrate | 0.01 | 0.00523 | 5.2±2 | 77 |
| Betamethasone: | | | | |
| 17-propionate 21-propionate | 0.01 | 0.00505 | 17.3±1 | 24 |
| | 0.1 | 0.0505 | 18.8±3 | 19 |
| 17-propionate 21-isobutyrate | 0.01 | 0.00519 | 22.6±2 | 1 |
| | 0.1 | 0.0519 | 14.6±1 | 36 |

The results reported in Table II show that at the tested dose 17,21-dipropionate and 17-propionate 21-isobutyrate of 6α,9α-difluoro prednisolone are potent inhibitors of exudate formation while the corresponding 17,21-diesters of betamethasone are unable to display an equivalent activity even when given at a 10 times higher dose.

(c) Agar granuloma assay.—The systemic anti-inflammatory activity of 17-propionate 21-esters of 6α,9α-difluoroprednisolone was evaluated in comparison with the corresponding 17,21-diesters of betamethasone, using the agar granuloma assay.

This test was performed according to the method of Cresseri and Meli (Arch. Sc. Biol., 37, 551; 1953) by employing female Wistar rats weighing about 50 g. In the cranial zone of the animals' dorsum a small 5% agar cylinder (diameter and height: 5 mm.) was implanted subcutaneously. Beginning from the subsequent day, the test steroids were daily given by subcutaneous injection in 0.2 ml. of sesame oil solution. The control rats received the vehicle alone. On the 6th day of treatment the animals were killed and the granuloma was removed and weighed. The degree of granuloma inhibition reflects the systemic potency of the test steroids.

The results reported in Table III show that the new steroids of this invention strongly reduce the capsule value, while the corresponding 17,21-diesters of betamethasone are almost inactive or only induce a moderate reduction versus controls.

The calculation of the relative potencies indicates that the 17-propionate 21-esters of 6α,9α-difluoroprednisolone have a systemic activity at least 10 times superior to that of betamethasone 17-propionate 21-isobutyrate, the most effective among the tested 17,21-diesters of betamethasone.

TABLE III

Agar Granuloma

| Subcutaneous treatment (0.2 ml. oil) | Daily dose μmole | Daily dose μg. | Granuloma (mg.) | Percent inhibition of granuloma |
|---|---|---|---|---|
| Control | | | 58.4±6 | 0 |
| 6α,9α-difluoroprednisolone: | | | | |
| 17-propionate 21-acetate | 0.05 | 0.02475 | 47.0±4.3 | 19.5 |
| | 0.5 | 0.2475 | 19.8±3.3 | 66 |
| 17-propionate 21-propionate | 0.05 | 0.02545 | 49.3±3.6 | 15.5 |
| | 0.5 | 0.2545 | 13.6±2.5 | 76.7 |
| 17-propionate 21-isobutyrate | 0.05 | 0.02615 | 30.4±4.0 | 47.9 |
| | 0.5 | 0.2615 | 0.0±0.0 | 100 |
| Betamethasone: | | | | |
| 17-propionate 21-acetate | 0.05 | 0.02455 | 60.6±5.6 | 0 |
| | 0.5 | 0.2455 | 55.0±7.3 | 5 |
| 17-propionate 21-propionate | 0.05 | 0.02525 | 58.6±4.1 | 0 |
| | 0.5 | 0.2525 | 57.5±8.3 | 1.5 |
| 17-propionate 21-isobutyrate | 0.05 | 0.02595 | 46.2±4.6 | 20.8 |
| | 0.5 | 0.2595 | 42.1±5.3 | 27.9 |

The experimental data obtained in three different biological assays show that the 17-propionate 21-esters of 6α,9α-difluoroprednisolone possess, both by topical and systemical way, a very high anti-inflammatory activity, being from 2 to 10 times more potent than the corresponding 17-monoesters and 17,21-diesters of betamethasone.

EXAMPLE 6

An ointment having the following composition is prepared for external use following accepted pharmaceutical compounding procedures:

| Components: | Percent by weight |
|---|---|
| 6α,9α-difluoroprednisolone 17-propionate, 21-acetate | 0.025 |
| Beeswax | 5.000 |
| Anhydrous lanolin | 5.000 |
| White soft paraffin | 20.000 |
| Amphocerin K (Dehydag, Deutsche Hydrier werke GmbH, Dusseldorf) | 25.000 |
| Liquid paraffin | 14.900 |
| Distilled water | 30.075 |

Melt the beeswax, the lanolin, the white soft paraffin and the liquid paraffin at 70° C., add the active ingredient, then the mixture of the Amphocerin K and the water. Refine twice.

EXAMPLE 7

An ointment for external use is prepared having the following composition:

| Components: | Percent by weight |
|---|---|
| 6α,9α-difluoroprednisolone 17-propionate, 21-acetate | 0.05 |
| Cetyl alcohol | 0.50 |
| Anhydrous lanolin | 5.00 |
| Distilled water | 5.00 |
| Benzyl alcohol | 0.50 |
| Liquid paraffin | 20.00 |
| White soft paraffin | 68.95 |

Melt the cetyl and benzyl alcohols, the liquid paraffin and the whole soft paraffin at 75° C., add the active ingredient, then the lanolin previously mixed with the water. Refine twice.

EXAMPLE 8

A cream for external use is prepared having the following composition:

| Components: | Percent by weight |
|---|---|
| 6α,9α-difluoroprednisolone 17-propionate 21-acetate | 0.025 |
| Propylparaben | 0.015 |
| Methylparaben | 0.025 |
| Sodium laurylsulphate | 1.000 |
| Propylene glycol | 12.000 |
| Stearyl alcohol | 15.000 |
| White soft paraffin | 12.500 |
| Liquid paraffin | 22.500 |
| Distilled water | 36.935 |

Melt the stearyl alcohol and the white soft paraffin on a steam bath, and warm to about 75° C., add a solution of the active ingredient in the propylene glycol, then the other ingredients, previously dissolved in the water and warmed to 75° C. Stir the mixture until it congeals.

In the above cream sodium laurylsulphate can be replaced by polyoxyl 40 stearate in an amount of 5% by weight.

Example 9

A cream for external use is prepared having the following composition:

| Components: | Percent by weight |
|---|---|
| 6α,9α-difluoroprednisolone 17,21-dipropionate | 0.050 |
| Cetostearyl alcohol | 12.000 |
| White soft paraffin | 6.480 |
| Liquid paraffin | 6.480 |
| Isopropyl stearate | 3.240 |
| Propylene glycol | 3.240 |
| Methylparaben | 0.180 |
| Propylparaben | 0.050 |
| Tween 80 | 0.200 |
| Polyethylene glycol 6000 | 4.950 |
| Distilled water | 63.130 |

Melt the cetostearyl alcohol, the white soft paraffin, the liquid paraffin and the isopropyl stearate at about 70° C., add a solution of the active ingredient in the propylene glycol, then the other ingredients previously mixed with the water and warmed to 70° C. Refine twice.

Example 10

An ointment for external use is prepared having the following composition:

| Components: | Percent by weight |
|---|---|
| 6α,9α-difluoroprednisolone 17-dipropionate, 21-acetate | 0.1 |
| Pure cholesterol | 3.0 |
| Stearyl alcohol | 8.0 |
| White soft paraffin | 51.0 |
| Liquid paraffin | 37.9 |

Add the active product to the other ingredients, previously melted at 75° C. and stir the mixture until it congeals.

Example 11

An ointment for external use is prepared having the following composition:

| Components: | Percent by weight |
|---|---|
| 6α,9α-difluoroprednisolone 17,21-dipropionate | 0.10 |
| Lanolin | 14.45 |
| Liquid paraffin | 17.75 |
| Neomycin sulphate | 0.40 |
| White soft paraffin | 67.30 |

Add the 6α,9α-difluoroprednisolone 17,21-dipropionate and the neomycin sulphate to the other ingredients previously melted at 75° C. and refine twice.

In place or besides the neomycin sulphate, other topically active antibiotics can be used, such as colistin sulphate bacitracin, gramicidin, chloramphenicol or the sulphonamides.

Example 12

An ophthalmic ointment is prepared having the following composition:

| Components: | Percent by weight |
|---|---|
| 6α,9α-difluoroprednisolone 17-dipropionate, 21-acetate | 0.025 |
| Liquid paraffin | 29.975 |
| White soft paraffin | 70.000 |

Add the active product to the other ingredients, previously sterilized by heating at 120° C. for an hour. Refine twice and distribute into sterile tubes.

Example 13

An ointment for external use is prepared having the following composition:

| Components: | Percent by weight |
|---|---|
| 6α,9α-difluoroprednisolone 17-dipropionate, 21-acetate | 0.025 |
| Pure choleesterol | 3.000 |
| Stearyl alcohol | 8.000 |
| White soft paraffin | 51.075 |
| Liquid paraffin | 37.900 |

Prepared as described in Example 10.

Example 14

An ointment for external use is prepared having the following composition:

| Components: | Percent by weight |
|---|---|
| 6α,9α-difluoroprednisolone 17,21-dipropionate | 0.025 |
| Lanolin | 14.450 |
| Liquid paraffin | 17.750 |
| Neomycin sulphate | 0.400 |
| White soft paraffin | 67.375 |

Prepared as described in Example 11.

EXAMPLE 15

Lotion having the following composition:

| Components: | Percent by weight |
|---|---|
| 6α,9α-difluoroprednisolone 17-propionate, 21-acetate | 0.03 |
| Ethyl alcohol, 95° | 50.00 |
| Propylene glycol | 20.00 |
| Distilled water | 29.97 |

Dissolve the active product in the alcohol and add the solution to a clear mixture of the other ingredients.

EXAMPLE 16

Lotion having the following composition:

| Components: | Percent by weight |
|---|---|
| 6α,9α-difluoroprednisolone 17,21-dipropionate | 0.05 |
| Ethyl alcohol, 95° | 40.00 |
| Glycerol | 10.00 |
| Propylene glycol | 30.00 |
| Distilled water | 19.95 |

Prepared as described in Example 15.

EXAMPLE 17

Hydrophilic ointment having the following composition:

| Components: | Percent by weight |
|---|---|
| 6α,9α-difluoroprednisolone 17,21-dipropionate | 0.025 |
| Propylparaben | 0.015 |
| Methylparaben | 0.025 |
| Sodium laurylsulphate | 1.000 |
| Propylene glycol | 12.000 |
| Stearyl alcohol | 25.000 |
| White soft paraffin | 25.000 |
| Distilled water to 100%. | |

Melt the stearyl alcohol and the white soft paraffin on a steam bath, and warm to about 75° C., add a solution of the active ingredient in the propylene glycol, then the other ingredients, previously dissolved in the water and warmed to 75° C. Stir the mixture until it congeals.

In the above hydrophilic ointment sodium lauryl-sulphate can be replaced by polyoxyl 40 stearate in an amount of 5% by weight.

EXAMPLE 18

Tablets having the following composition:

| | Mg. |
|---|---|
| 6α,9α-difluoroprednisolone 17,21-dipropionate | 2.000 |
| Lactose spray dried | 97.500 |
| Calcium stearate | 0.500 |

Pass the spray dried lactose through a No. 60 B.S. mesh sieve. Dissolve the active ingredient in about 0.03 cc. of ethyl alcohol 95°. Add the clear solution to the sieved lactose, mix well and let the solvent evaporate at room temperature in the usual manner. Add the calcium stearate to the dried mass, mix again and compress into tablets on 6 mm. diameter bisected punches.

EXAMPLE 19

In the same manner as described in Example 18, there are prepared tablets having the following composition:

| | Mg. |
|---|---|
| 6α,9α-difluoroprednisolone 17,21-dipropionate | 0.2 |
| Lactose spray dried | 99.3 |
| Calcium stearate | 0.5 |

Calcium stearate may be replaced by magnesium stearate. Similarly, placebo granules may be employed in the above composition instead of lactose. The placebo granules were made of 80% lactose and 20% rich starch.

EXAMPLE 20

Parenteral aqueous suspension having the following composition:

| | Mg. |
|---|---|
| 6α,9α-difluoroprednisolone 17,21-dipropionate | 5 |
| Polyethylene glycol, 400 U.S.P. | 20 |
| Polysorbate 80, U.S.P. | 8 |
| Water for injection, U.S.P. to 1 ml. | |

EXAMPLE 21

An oil solution for parenteral use containing 0.05% by weight of 6α,9α-difluoroprednisolone 17,21-dipropionate was prepared by dissolving 0.5 g. of the active ingredient in one liter sesame oil and transferring the solution into suitable sized sterile vials under aseptic conditions.

In the same manner, the active ingredient was dissolved in 500 cc. mixture (1:1) of sesame oil and olive oil and the limpid solution filled into 0.2 cc. soft gelatin capsules for oral use, so that each capsule contains exactly 0.2 mg. of 6α,9α-difluoroprednisolone 17,21-dipropionate. It is understood that the 17,21-dipropionate or the 17-propionate, 21-acetate of 6α,9α-difluoroprednisolone which is contained as active ingredient in the pharmaceutical formulations illustrated in Examples 6 to 21 may be replaced, in accordance with the invention, by the 17-propionate, 21-isobutyrate of 6α,9α-difluoroprednisolone.

We claim:
1. A pharmaceutical composition for use in the treatment of inflammation comprising from 0.005 to 5 percent by weight of a steroid compound of the formula:

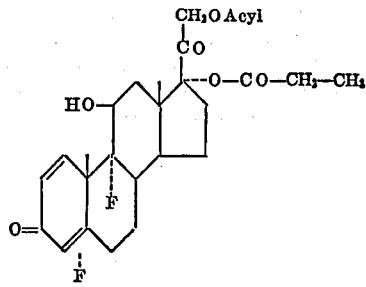

wherein Acyl is a member of the group consisting of acetyl, propionyl and isobutyryl, in association with a pharmaceutical carrier.

2. A composition as claimed in claim 1 containing from about 0.001 to about 0.25 percent by weight of said steroid.

3. A pharmaceutical composition as claimed in claim 1 for use in the systemic treatment of inflammation, wherein the steroid compound is used in association with a systemic pharmaceutical carrier.

4. A composition as claimed in claim 3 in which said steroid is 6α,9α-difluoroprednisolone 17,21-dipropionate.

5. A composition as claimed in claim 3 in which said steroid is 6α,9α - difluoroprednisolone 17 - propionate, 21-isobutyrate.

6. A pharmaceutical composition as claimed in claim 1, for use in the topical treatment of inflammation, wherein the steroid compound is used in association with a topical pharmaceutical carrier.

7. A composition as claimed in claim 6 in which said steroid is 6α,9α-difluoroprednisolone 17,21-dipropionate.

8. A method of treating inflammatory conditions which comprises administering an effective amount of a steroid selected from the group consisting of 17-propionate, 21-acetate, 17-propionate, 21-isobutyrate and 17,21-dipropionate of 6α,9α-difluoroprednisolone incorporated in a pharmaceutical carrier.

9. A method as claimed in claim 8 wherein from 0.0005% to 5% by weight of said steroid is used.

10. A method as claimed in claim 8 wherein from 0.001% to 0.25% by weight of said steroid is used.

11. A method as claimed in claim 9 wherein a systemic pharmaceutical carrier is used.

12. A method as claimed in claim 11 in which said steroid is 6α,9α-difluoroprednisolone 17-propionate, 21-isobutyrate.

13. A method as claimed in claim 11 in which said steroid is 6α,9α-difluoroprednisolone 17,21-dipropionate.

14. A method as claimed in claim 9 wherein a topical pharmaceutical carrier is used.

15. A method as claimed in claim 14 in which said steroid is 6α,9α-difluoroprednisolone 17,21-dipropionate.

References Cited
UNITED STATES PATENTS 3,152,154  10/1964  Ercoli et al. ____ 260—239.55 D
3,312,590  4/1967   Elks et al. _____ 424—243
3,422,193  1/1969   Shapiro et al. _____ 424—243

OTHER REFERENCES

Dulin et al.: P.S.E.B.M., vol. 104, pp. 345–348, 1960.
Edwards et al.: J.A.C.S., vol. 81, pp. 3156 and 3157, 1959.

RICHARD L. HUFF, Primary Examiner